United States Patent [19]

McParland

[11] Patent Number: 4,941,512

[45] Date of Patent: Jul. 17, 1990

[54] METHOD OF REPAIRING HEAT EXCHANGER TUBE ENDS

[75] Inventor: Kevin W. McParland, Fairfield, Conn.

[73] Assignee: CTI Industries, Inc., Fairfield, Conn.

[21] Appl. No.: 384,972

[22] Filed: Jul. 25, 1989

Related U.S. Application Data

[63] Continuation of Ser. No. 271,158, Nov. 14, 1988, abandoned, which is a continuation of Ser. No. 97,665, Sep. 15, 1987, abandoned.

[51] Int. Cl.$^5$ .................................................. F16L 1/00
[52] U.S. Cl. ......................................... 138/97; 138/98; 138/109; 165/76; 29/523; 29/402.11
[58] Field of Search ............................. 138/97, 98, 109; 29/157.4, 402.01, 402.03, 402.08, 402.09, 402.11, 402.12, 523; 165/76

[56] References Cited

U.S. PATENT DOCUMENTS

| | | | |
|---|---|---|---|
| 1,937,600 | 12/1933 | Spanyol | 138/140 |
| 2,092,358 | 9/1937 | Robertson | 138/97 |
| 2,157,107 | 5/1939 | Bay | 138/96 R |
| 3,317,222 | 5/1967 | Maretzo | 138/97 |
| 3,781,966 | 1/1974 | Lieberman | 138/97 |
| 3,962,767 | 6/1976 | Byerley et al. | 138/98 |
| 4,505,017 | 3/1985 | Schukei | 138/97 |
| 4,527,322 | 7/1985 | Jackson | 138/97 |
| 4,637,436 | 1/1987 | Stewart et al. | 165/76 |
| 4,694,549 | 9/1987 | Rabe | 138/97 |

FOREIGN PATENT DOCUMENTS 1588971  5/1981  United Kingdom ................ 138/98

Primary Examiner—James E. Bryant, III
Attorney, Agent, or Firm—Parmalee, Bollinger & Bramblett

[57] ABSTRACT

Heat exchanger tubing has failure rates due to inlet end related problems in the 85–90% range. Such failures are normally limited to the first three to six inches of the tube inlet ends. The present method eliminates the problem without relining, removing, or sealing the tubes. The tube ends are first inspected and the condition of the inlet areas of the tubing determined. If the ends are eroded or corroded, the tube ends are cleaned down to the metal. Then a metallurgically compatible insert is installed in the damaged end and controllably roller-expanded to eliminate any end step at the downstream end as well as to prevent over expansion of the damaged tube and insert. The input end of the insert is flared to the existing inlet tube profile, thereby restoring the damaged area. This process eliminates totally replacing or relining the existing tubes. If erosion is severe, a bushing is inserted between the insert and the tube end and they are roller-expanded together. The tube may also be bored out to restore tube concentricity before the insert is installed. In another embodiment the damaged tube end is severed and replaced with a collar before the insert is installed and then roller-expanded to restore the damaged end.

3 Claims, 3 Drawing Sheets

METHOD OF REPAIRING HEAT EXCHANGER TUBE ENDS

This is a continuation of Ser. No. 271,158, filed Nov. 14, 1988, which is a continuation of Ser. No. 097,665, filed Sep. 15, 1987, both now abandoned.

TECHNICAL FIELD

This invention relates to the repair of heat exchanger tubes.

BACKGROUND OF THE INVENTION

This invention relates to repairing tubing of a heat exchanger and, more particularly, to a method for repairing the input ends of the heat exchanger tubes.

Heat exchangers such as surface condensers used in steam power plants to condense steam turbine exhaust contain a large number of relatively thin walled, small diameter tubes through which cooling water is passed. There may be thousands of such tubes of differing lengths, for example 30 to 50 feet long, which extend through a generally cylindrical condenser housing between water boxes at either end. The exhaust steam from the turbine low pressure stages is condensed on the cold surfaces of the tubes and gathers in a hot well from which it is returned to the boiler.

These condensers and other shell and tube heat exchangers primarily fail due to inlet end corrosion or erosion and tube end cracking. Experience shows that the failure rate of tubes due to inlet end related problems amount to between 80 and 90% of all such failures. This sort of failure mechanism attacks all or most of the tubes to more or less the same degree. The attack finally results in massive or catastrophic tube failures necessitating costly and time consuming relining or retubing. In power stations this can mean shutting down the entire plant for up to three months. In ships, particularly combat vessels, retubing may require cutting through the ship's hull and deck for equipment removal to permit access to perform the retubing function.

Aside from the total tube replacement or total relining of the damaged tube, numerous corrective measures have been tried with varying degrees of success. For example, inserts for protecting tubes from erosion and corrosion damage are disclosed in U.S. Pat. Nos. 1,937,600; 2,157,107; 2,262,042; 2,445,273; and 2,620,830. All these inserts disclosed in the aforesaid patents rely on a press fit, adhesive, or fiber type rings to establish a seal between the insert and the tube. In order to restore the heat exchanger to design conditions, the tube to tube sheet joint must be restored. None of the aforesaid patents take this joint integrity into account. In order to restore the joint strength, metal must replaced where it has been eroded or corroded away.

In U.S. Pat. No. 3,781,966 there is disclosed the use of two metallic sleeves with the first sleeve being inserted and expanded into engagement with the tube. Although the sleeve fractures in the region where it expands the most, this is overcome by inserting a second metallic sleeve into the first which is again expanded into engagement with the fractured first sleeve. The second sleeve has substantially the same thickness and outside diameter as the first sleeve but it is a shorter length since it can only be inserted part way into the first sleeve. This procedure is time consuming and provides no assurance that the second sleeve will not be fractured like the first, requiring a complete replacement of the tube and defeating the purpose of the repair operation. Since the first sleeve is fractured, joint strength integrity is compromised. In addition, the interior diameter of the tubing is uneven and may restrict the fluid flow therein.

DISCLOSURE OF INVENTION

Accordingly it is an object of this invention to provide a new and improved method of repairing tubes in a heat exchanger or the like which is simple, effective, and does not require the replacement or the removal of the tubes of the heat exchanger in order to repair them.

A further object of this invention is to provide a method of repairing tube ends in a heat exchanger which restores the tube to tube sheet joint strength.

Another object of this invention is to provide a new and improved method for repairing tubes in a heat exchanger which restores the internal concentricity of the tubes and is limited to the input ends of the tubes without substantially restricting the interior diameter of the heat exchanger tubing.

In carrying out this invention in one illustrative embodiment thereof, a method of repairing tubes in a heat exchanger or the like is provided in which the tube ends are inspected for determining the condition of the inlet areas of the tubing. The tube ends are cleaned to remove corrosion and debris in the identified areas of repair and metallurgically compatible inserts are installed in the damaged tube ends. The inserts are controllably roller expanded to restore joint strength and seal the insert to the tube. The roller expansion extends to the downstream end of the insert to insure concentricity in the repaired tube and to prevent end step erosion. Then the other end of the insert is flared to the existing inlet tub profile.

In a further embodiment, if the corrosion of the inlet end exceeds predetermined limits based on the thickness of the tube, the corroded tube ends are bored out and a bushing is inserted into the bored concentric inlet end prior to the installation and rolling of the inserts. As an added feature, the bushings may be presized corresponding to the dimension of the area removed from the ends in the boring step. Since the boring and removal of the corroded areas of the inlet ends of the tube will normally be to the same depth and internal diameter, the bushings Which are placed therein will conform to the predetermined removal dimensions.

In a further embodiment, where corrosion is so bad as to prevent the orderly removal therefrom, the bad tube end is completely severed, removed, and replaced with a collar prior to the installation of the insert. The insert is then roller expanded in the collar and tube to restore the tube and tube sheet joint integrity.

BRIEF DESCRIPTION OF THE DRAWINGS

The invention, together with further advantages, ojects, features and aspects thereof may be more clearly understood from the following description taken in conjunction with the accompanying drawings in which like elements are designated with the same reference numeral throughout the various views.

BEST MODE FOR CARRYING OUT THE INVENTION

The method of the present invention is described in connection with drawings which are neither to scale nor represent the variety of heat exchangers in which the method may be employed. However, the method to be described will be applicable to a variety of heat exchanger applications regardless of the size or amount of tubing and the manner in which it is supported in the heat exchanger.

Figure 1:
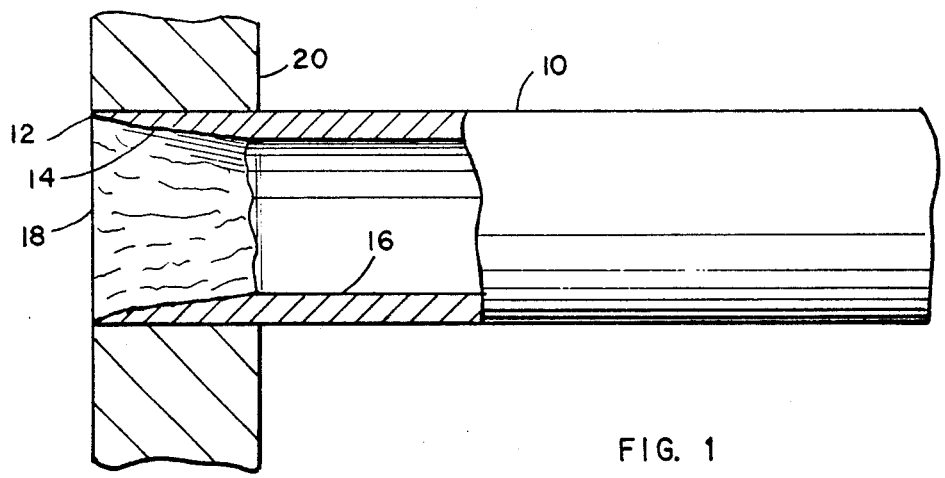
FIG. 1 is a cross-sectional view of a tube end which has been corroded and is to be repaired.
Figure 2:
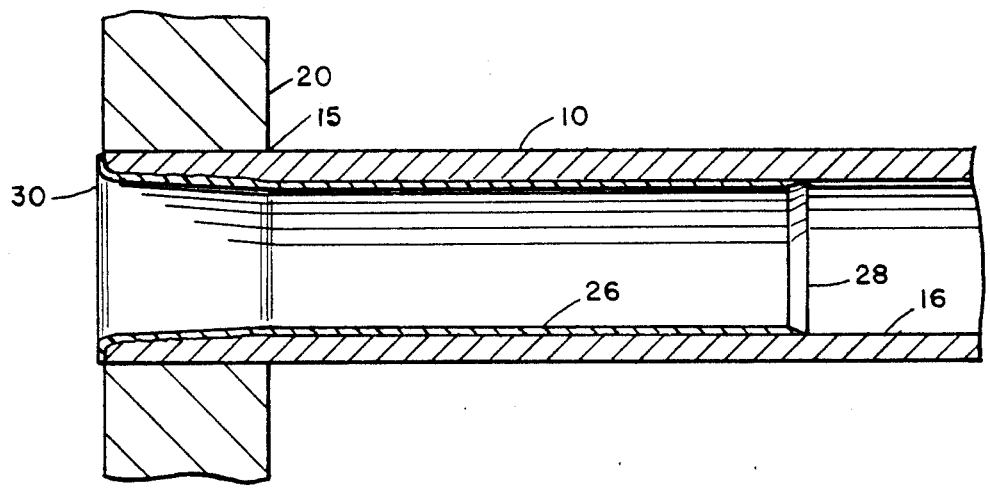
FIG. 2 is a cross-sectional view illustrating a metal insert installed and roller expanded in the corroded tube end of FIG. 1.

In carrying out the method of the present invention the first step will be an inspection that firmly identifies the failure mechanism associated with the tubing involved. Referring now to FIG. 1, a heat exchanger tube 10 is shown mounted in a tube sheet 20. On the initial inspection it is noted tht the tube end 12 is corroded or eroded in an area 14 inwardly along the inside diameter 16 of the tube 10. It has been found that this type of erosion or corrosion causing failure of the tube 10 is usually limited to the first three to six inches of the tube inlet 18. The corrosion or erosion generally takes the shape of an elliptical or trumpet-like form which, in effect, eliminates the concentricity of the inside diameter 16 of the tube 10. After the initial inspection determining that the repair procedure is applicable, the location and identification of the tube failure mechanism in the input end 18 is determined along with the length required for the necessary bushing or insert.

It will apparent from FIG. 1 that the erosion 14 has severely reduced the tube to tube sheet joint strength. Accordingly, in order to restore the heat exchanger to design conditions, and thus permit it to be used for many more years, it is necessary that this joint 15 between the tube sheet 20 and the tube 10 be restored. Other methods of repairing the input end of heat exchanger tubes have not taken this joint strength into account. In order to restore the joint strength, the corroded or eroded metal must be replaced.

After the initial inspection and wire brushing the inlet end to bare metal for the length required, a compatible thin-walled metal insert 26 is installed inside and contiguous to the inside diameter 16 of the tube 10. The metal insert 26 must be fabricated from alloys that are metallurgically compatible with the tubes, tube sheets, and water boxes to avoid galvanic attack. Also, they must be expandable without splitting or work hardening. The inserts 26 must be able to withstand water inlet velocities of at least 20 feet per second, and when expanded will return the joint strength back to the specifications of the original design. The wall thicknesses will normally not be greater than 0.02 inch with an outside diameter large enough to fit snugly within the tube 10 without binding, but not being so small as to leave too much clearance between the tube 10 and the insert 26. The length of the insert 26 is determined by prior inspection and, in general, must be enough to cover any erosion present. Since the tube problem usually exists in the first six inches of the tube inlet, the insert can be a predetermined length for most applications.

The insert 26 is then controllably roller expanded over its entire length to restore joint 15 strength and to seal the insert 26 to the tube 10. The thin wall design of the insert 26 ensures elimination of end step erosion along end 28 which might occur if any gap occurs between the end 28 of the insert 26 and the inside diameter 16 of the tube 10. Roller expanding the insert 26 at the downstream end 28 insures concentricity with the parent tube 10, seals the insert 26 to the tube 10, and further eliminates any end step erosion. As an additional feature, chamfering to an angle of 30° by use of a cutting tool on the downstream end 28 of the insert 26 may help prevent step erosion. It should be pointed out that the chamfering, should not be done using a grinding tool as this might increase the outside diameter of the insert and cause local hot spots in the metal insert.

The controlled roller expansion step may be performed using conventional roller expanders, hydraulic expanders, or deformation expanders. The insert 26 is roller expanded at the inlet area and through the length of the insert until a metal to metal fit is achieved. This may require more than one expansion. The expander must be controllable to insure uniform expansion of all tubes without over-expanding the parent tube by more than 0.002 inches. It is essential that the tubes 10 be kept within these limits as over-expanding tubes can cause stress corrosion cracking at the joints 15 and will also prevent normal tube removal if future retubing becomes necessary.

The inserts 26 are then flared to conform to the existing tube to tube sheet profile. The flared end 30 protects the tube end and, because it is set in the field, contours itself to the existing tube and tube sheet profile. It might be added that the metal used for the insert 26 results in negligible loss of heat transfer because of the metal to metal contact between the insert 26 and the tube 10. The thin wall of the insert 26 also insures little difference in the design flow rate and velocity of circulating water in the heat exchanger.

Figure 3:
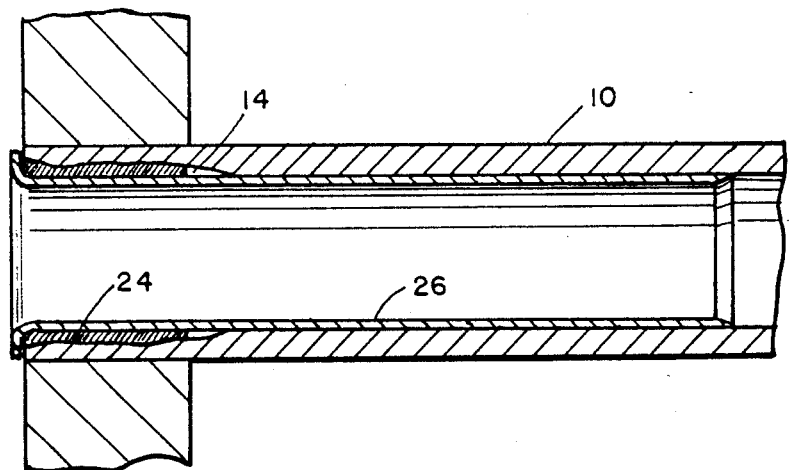
FIG. 3 is a cross-sectional view similar to FIG. 2 illustrating the use of a metal bushing between the metal insert and the corroded tube end.

FIG. 3 illustrates another embodiment of this invention in which a bushing 24 is inserted between the tube sheet 20 and the insert 26 in the corroded area 14 of the tube 10. This becomes necessary when a gap of more than 0.030 inch or more exists in the eroded area 14. The reason is that the insert 26 cannot be expanded enough without fracturing or otherwise failing to make a strong joint 15 with the tube sheet 20. Once the bushing 24 is inserted in the corroded area 14 and the insert 26 installed in the tube 10, roller expansion is applied for restoring the integrity of joint 15.

Figure 4:
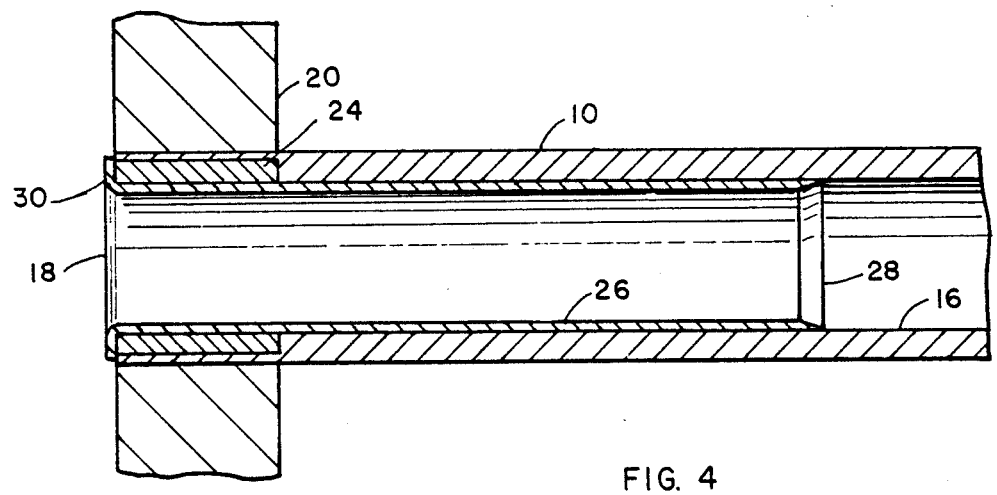
FIG. 4 is a cross-sectional view illustrating a bored out tube end having a bushing therein to restore the concentricity of the tube in accordance with another embodiment of the invention.

It will be noted that the corroded or eroded area 14 may result in an elliptical, oval, or trumpet shaped configuration of the tubing inlet 18. In order to restore concentricity to the input end, the inlet end 18 is bored out through the area 14. This drilling is done using a bit having a guide rod at its end which extends into tube 10 so as to center the bit. A bushing 24 is inserted into the restored concentric area 22, as will be seen in the embodiment illustrated in FIG. 4. This substantially restores the inside diameter 16 for the entire length of the tube 10 including the inlet area 18. The insert 26 is then installed contiguous to the inside diameter of the bushing 24 and the inside diameter 16 of the tube 10. It is then controllably roller-expanded in the manner previously described.

Figure 5:
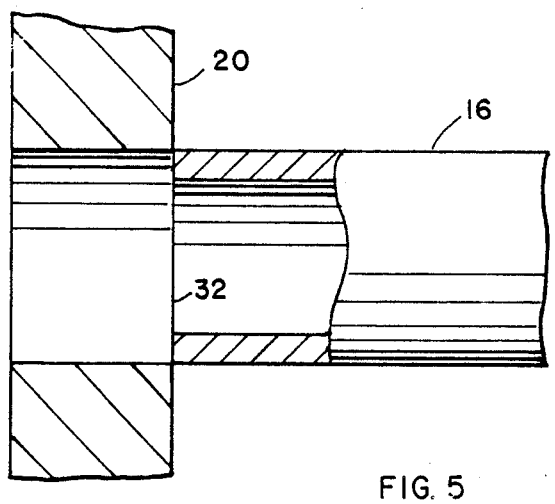
FIG. 5 is a cross-sectional view illustrating a tube with its end removed in accordance with another embodiment of the invention.
Figure 6:
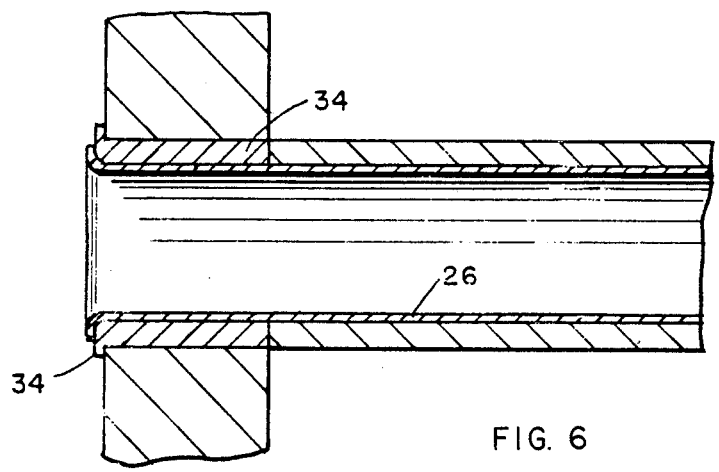
FIG. 6 is a cross-section of the tube end of FIG. 5 repaired using a collar to replace the removed end.

As illustrated in FIGS. 5 and 6, in extreme cases of wall loss, the tube 16 is cut off on line 32, and the cut tube end is completely removed from the tube sheet 20. A collar 34 having approximately the same inside and outside diameters as the tube 26 is used to replace the removed tube end. The insert 26 is then installed in the tube 10 and roller-expanded in the manner previously described and flared to conform to the outer profile of the tube sheet 20 and tube 10.

Since the failure normally occurs within the first six inches of the inlet end of the tube, the bushings or collars in most instances may be presized to correspond to the length of the region required to be removed from the end. The inside diameter of the tube as well as the tube to tube sheet joint strength is restored close to original, and the tubing can be used for many more years. The various methods described herein eliminate the need for costly and time-consuming retubing or relining of tubing which in many cases cannot be done in situ. When used in power station applications these methods avoid the shutting down of the power station for long periods. In shipboard applications repairs may be made without materially altering the structure of the vessel or beaching the ship for long periods of time while such repairs are made. This process is simple, easy to apply and takes care of up to 90% of the failure modes in heat exchanger tubes.

Since other changes and modifications, varied to fit particular operating requirements and environments, will be apparent to those skilled in the art, the invention is not limited to the examples chosen for purposes of illustration. This invention includes all changes and modifications which do not constitute a departure from the true spirit and scope of this invention as claimed in the following claims and equivalents thereof.

I claim:

1. The method of repairing a tube having a damaged inlet end supported in a tube sheet by a tube to tube sheet joint in a heat exchanger comprising the steps of:
   inspecting inlet end of said tube for determining the condition of the end of the tube;
   cleaning the inlet end of said tube by removing loose metal, debris and corrosion to bare metal when a damaged inlet end is found;
   installing a metallurgically compatible metal insert in the damaged inlet end of said tube, said insert having an upstream insert end adjacent said inlet end of said tube and a downstream insert end spaced from said inlet end;
   non-welding securing said insert along its entire length in said tube without welding said insert in said tube by non-explosively, controllably roller expanding the insert along its entire length within said tube to substantially minimize any end step on the downstream end of said insert, improve the tube to tube sheet joint strength, and prevent overexpansion of the damaged tube and insert to avoid fracturing the tube or insert; and
   flaring the upstream end of said insert to the existing tube profile.

2. The method as claimed in claim 1 including the step of:
   inserting a metal bushing in the damaged inlet end prior to installing the insert when the erosion exceeds a depth of approximately 0.03 inch on the damaged inlet end; and
   non-explosively roller expanding the bushing along with the insert in the controllable expansion step.

3. The method as claimed in claim 1 including the step of:
   chamfering the downstream end of said insert to an angle of approximately 30 degrees using a cutting tool.

* * * * *